United States Patent
Numata et al.

(10) Patent No.: US 7,069,502 B2
(45) Date of Patent: Jun. 27, 2006

(54) STRUCTURED DOCUMENT MANAGEMENT SYSTEM AND STRUCTURED DOCUMENT MANAGEMENT METHOD

(75) Inventors: Kenichi Numata, Yokohama (JP); Shigehisa Kawabe, Yokohama (JP); Masao Nukaga, Yokohama (JP); Toshifumi Yamada, Yokohama (JP); Minoru Ikeda, Yokohama (JP); Kazuhiko Higashi, Yokohama (JP); Miho Yamada, Minato-ku (JP)

(73) Assignee: Fuji Xerox Co., LTD, Tokyo (JP)

( * ) Notice: Subject to any disclaimer, the term of this patent is extended or adjusted under 35 U.S.C. 154(b) by 928 days.

(21) Appl. No.: 10/013,375

(22) Filed: Dec. 13, 2001

(65) Prior Publication Data

US 2003/0041304 A1    Feb. 27, 2003

(30) Foreign Application Priority Data

Aug. 24, 2001   (JP)   ............................. 2001-254400

(51) Int. Cl.
G06F 17/30 (2006.01)
G06F 9/44 (2006.01)

(52) U.S. Cl. ................. 715/513; 717/120; 707/203; 707/104.1

(58) Field of Classification Search .................. 707/1, 707/10, 14, 3, 102, 203, 104; 706/11; 717/109, 717/136, 142, 143, 120
See application file for complete search history.

(56) References Cited

U.S. PATENT DOCUMENTS

| | | | | |
|---|---|---|---|---|
| 4,688,195 A | * | 8/1987 | Thompson et al. ............ 706/11 |
| 5,860,004 A | * | 1/1999 | Fowlow et al. ............. 717/109 |
| 6,073,129 A | * | 6/2000 | Levine et al. ................... 707/4 |
| 6,151,601 A | * | 11/2000 | Papierniak et al. ........... 707/10 |
| 6,604,100 B1 | * | 8/2003 | Fernandez et al. ............. 707/3 |
| 6,697,808 B1 | * | 2/2004 | Hurwood et al. ............. 707/10 |
| 6,711,585 B1 | * | 3/2004 | Copperman et al. ...... 707/104.1 |
| 6,721,727 B1 | * | 4/2004 | Chau et al. ..................... 707/3 |
| 6,785,673 B1 | * | 8/2004 | Fernandez et al. ............. 707/3 |
| 6,799,184 B1 | * | 9/2004 | Bhatt et al. ................. 707/102 |
| 6,886,156 B1 | * | 4/2005 | McCormack ................ 717/136 |
| 2002/0049738 A1 | * | 4/2002 | Epstein .......................... 707/1 |

OTHER PUBLICATIONS

Hampton, "Using XML and relational database with Perl", Dec. 2000, 8 pages. Online version can be accessed at <http://www.xml.com/pub/a/2000/12/13/perlxmldb.html>.*

Kappel et al., "X-ray Towards integrating XML and relational database systems", Jul. 2000, 8 pages. Online version can be accessed at <www.ifs.uni-linz.ac.at/ifs/ research/ publications/papers00.html>.*

* cited by examiner

Primary Examiner—Tuan Dam
Assistant Examiner—Thuy Dao
(74) Attorney, Agent, or Firm—Oliff & Berridge, PLC

(57) ABSTRACT

A structured document management system for managing a structured document is disclosed, the system including: an element registration unit for registering attribute information and content information about each of elements in the structured document as element information; a structural information registration unit for registering relations between the elements in the structured document as binary format structural information; and an information retaining unit for retaining the element information registered by the element registration unit as records of a relational database while preserving the binary format structural information registered by the structural information registration unit.

10 Claims, 19 Drawing Sheets

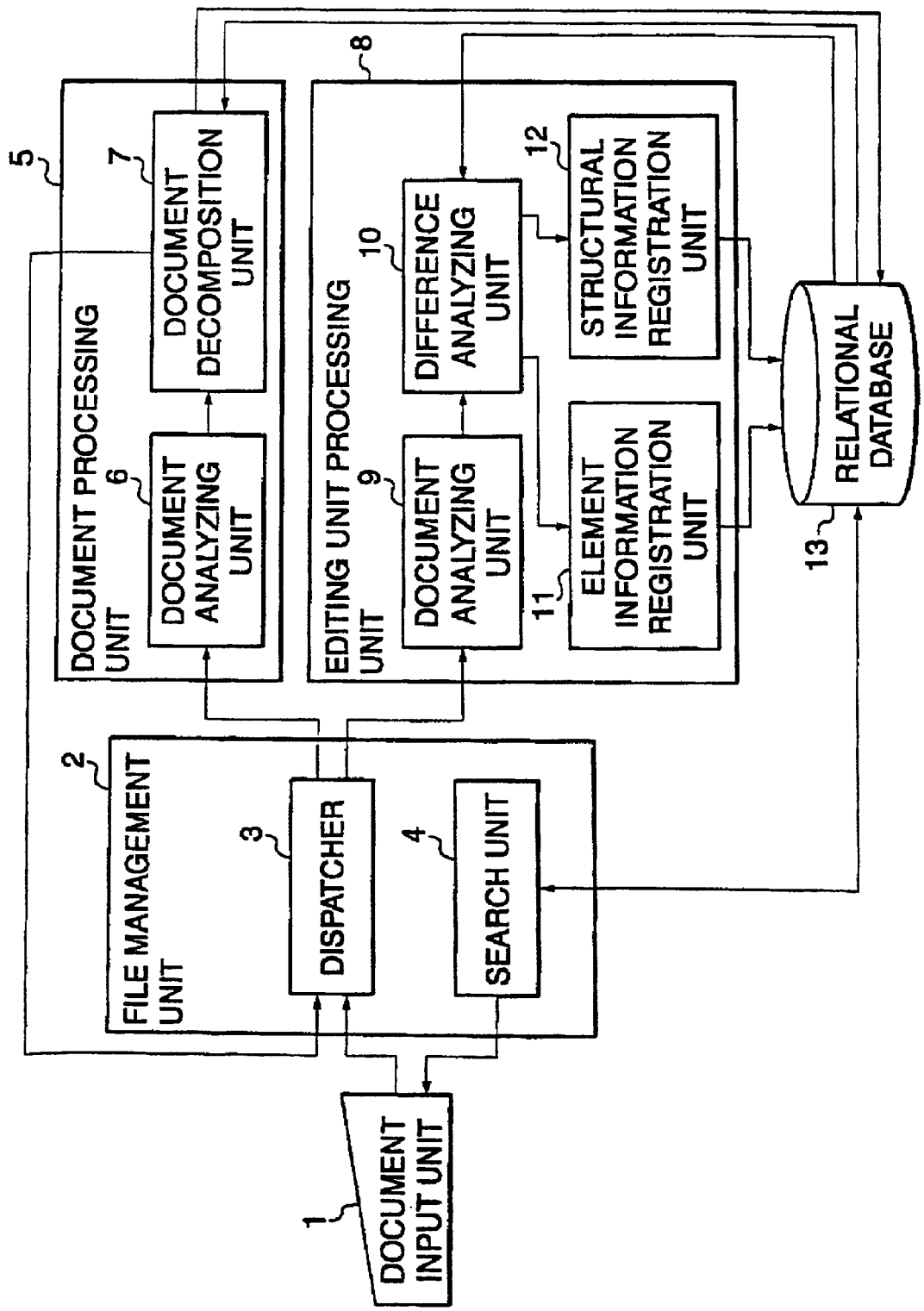

FIG. 3A

| GID= | 0 | 1 | 2 |
|---|---|---|---|
| | -1 | 0 | 0 |

DOCUMENT ID

| 1001 | BINARY FORMAT DATA |
|---|---|

FIG. 3B

| SNo | LNo | ELEMENT NAME | ATTRIBUTE VALUE | DELETED VERSION | ADDED VERSION |
|---|---|---|---|---|---|
| 5 | 0 | CONTENTS | ····· | NULL | 1 |
| 6 | 1 | PARAGRAPH 1 | ····· | NULL | 1 |
| 7 | 2 | PARAGRAPH 2 | ····· | NULL | 1 |
| 8 | 3 | PARAGRAPH 3 | ····· | NULL | 1 |

FIG. 3C

| LNo= | 0 | 1 | 2 | 3 |
|---|---|---|---|---|
| | -1 | 0 | 0 | 0 |

CLUSTER ID

| 102 | BINARY FORMAT DATA |
|---|---|

FIG. 3D

| CLUSTER ID | GID | VERSION |
|---|---|---|
| 101 | 0 | 1 |
| 102 | 1 | 1 |
| 103 | 2 | 1 |

| | SNo | LNo | ELEMENT NAME | ATTRIBUTE VALUE | DELETED VERSION | ADDED VERSION |
|---|---|---|---|---|---|---|
| | 5 | 0 | CONTENTS | ····· | NULL | 1 |
| | 6 | 1 | PARAGRAPH 1 | ····· | NULL | 1 |
| DELETED → | 7 | 2 | PARAGRAPH 2 | ····· | 1 | 1 |
| | 8 | 3 | PARAGRAPH 3 | ····· | NULL | 1 |
| ADDED → | 11 | 4 | PARAGRAPH 2' | ····· | NULL | 2 |

| | CLUSTER ID | GID | VERSION |
|---|---|---|---|
| | 3 | 2 | 1 |
| ADDED → | 4 | 2 | 2 |

FIG. 5A

| MAXIMUM GID | PARENT GID | PARENT CONNECTION ID | EDITING UNIT ID | ... |
|---|---|---|---|---|

| DOCUMENT ID | BINARY FORMAT DATA |
|---|---|

FIG. 5B

NODE TABLE

| SNo | LNo | EDITING UNIT ID | ELEMENT NAME | DOCU-MENT ID | ADDED VERSION | DELETED VERSION | MOUNT POINT NUMBER |
|---|---|---|---|---|---|---|---|

ATTRIBUTE TABLE

| SNo | ATTRIBUTE NAME | ATTRIBUTE VALUE |
|---|---|---|

TEXT TABLE

| SNo | LNo | EDITING UNIT ID | ELEMENT VALUE | DOCU-MENT ID | ADDED VERSION | DELETED VERSION |
|---|---|---|---|---|---|---|

FIG. 5C

| LNo | NODE ORDER | MAXIMUM NODE ORDER | ... |
|---|---|---|---|

| CLUSTER ID | BINARY FORMAT DATA |
|---|---|

FIG. 5D

| CLUSTER ID | EDITING UNIT ID | VERSION | DOCU-MENT ID |
|---|---|---|---|

FIG. 6A

```
<BOOK ID= "F00000000000000">
<TITLE ID= "F00000000000001">READING= "BOOK TITLE"
<PARA ID= "F00000000000002">BOOK TITLE</PARA>
</TITLE>
<PART ID= "F04000000000000">
<TITLE ID= "F04000000000002">READING= "PART TITLE"
<PARA ID= "F04000000000003">PART TITLE</PARA>
</TITLE>
<CHAPTER ID= "F04010000000000">
<TITLE ID= "F04010000000002">READING= "CHAPTER TITLE"
<PARA ID= "F04010000000003">CHAPTER TITLE</PARA>
</TITLE>
<DOCITEM ID= "F04010000000004">
<PARA ID= "F04010000000005">TEXT</PARA>
</DOCITEM></CHAPTER></PART></BOOK>
```

FIG. 6B

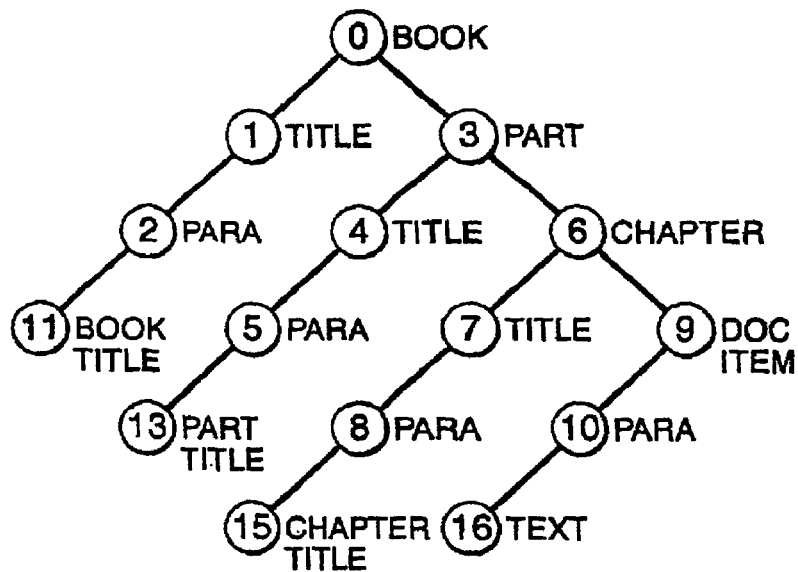

EDITING UNIT ID = 0, GID = 0

```
<BOOK ID= "F00000000000000">
<TITLE ID= "F00000000000001" >READING= "BOOK TITLE"
<PARA ID= "F00000000000002" >BOOK TITLE</PARA>
</TITLE> &E001;</BOOK>
```

EDITING UNIT ID= 1, GID= 1

```
<PART ID= "F04000000000000" >
<TITLE ID= "F04000000000002" >READING= "PART TITLE"
<PARA ID= "F04000000000003" >PART TITLE</PARA>
</TITLE> &E002; </PART>
```

EDITING UNIT ID= 2, GID= 2

```
<CHAPTER ID= "F04010000000000">
<TITLE ID= "F04010000000002">READING= "CHAPTER TITLE"
<PARA ID= "F04010000000003">CHAPTER TITLE</PARA>
</TITLE>
<DOCITEM ID= "F04010000000004">
<PARA ID= "F04010000000005">TEXT</PARA>
</DOCITEM></CHAPTER>
```

| GID= 0 | | | | GID= 1 | | | | GID= 2 | | | |
|---|---|---|---|---|---|---|---|---|---|---|---|
| 2 | -1 | -1 | 0 | 2 | 0 | 001 | 1 | 2 | 1 | 002 | 2 |

FIG. 11A

NODE TABLE

| SNo | LNo | EDITING UNIT ID | ELEMENT NAME | DOCUMENT ID | ADDED VERSION | DELETED VERSION | MOUNT POINT NUMBER |
|---|---|---|---|---|---|---|---|
| 0 | 0 | 0 | BOOK | 0 | 1 | NULL | 1 |
| 1 | 1 | 0 | TITLE | 0 | 1 | NULL | 0 |
| 2 | 2 | 0 | PARA | 0 | 1 | NULL | 0 |
| 3 | 0 | 1 | PART | 0 | 1 | NULL | 1 |
| 4 | 1 | 1 | TITLE | 0 | 1 | NULL | 0 |
| 5 | 2 | 1 | PARA | 0 | 1 | NULL | 0 |
| 6 | 0 | 2 | CHAPTER | 0 | 1 | NULL | 0 |
| 7 | 1 | 2 | TITLE | 0 | 1 | NULL | 0 |
| 8 | 2 | 2 | PARA | 0 | 1 | NULL | 0 |
| 9 | 3 | 2 | DOCITEM | 0 | 1 | NULL | 0 |
| 10 | 4 | 2 | PARA | 0 | 1 | NULL | 0 |

FIG. 11B

ATTRIBUTE TABLE

| SNo | ATTRIBUTE NAME | ATTRIBUTE VALUE |
|---|---|---|
| 0 | ID | F0000000000000 |
| 1 | ID | F0000000000001 |
| 1 | READING | BOOK TITLE |
| 2 | ID | F0000000000002 |
| 3 | ID | F0400000000000 |
| 4 | ID | F0400000000002 |
| 4 | READING | PART TITLE |
| 5 | ID | F0400000000003 |
| 6 | ID | F0401000000000 |
| 7 | ID | F0401000000002 |
| 7 | READING | CHAPTER TITLE |
| 8 | ID | F0401000000003 |
| 9 | ID | F0401000000004 |
| 10 | ID | F0401000000005 |

FIG. 12

TEXT TABLE

| SNo | LNo | EDITING UNIT ID | ELEMENT VALUE | DOCUMENT ID | ADDED VERSION | DELETED VERSION |
|---|---|---|---|---|---|---|
| 11 | 3 | 0 | BOOK TITLE | 0 | 1 | NULL |
| 12 | 4 | 0 | E001 | 0 | 1 | NULL |
| 13 | 3 | 1 | PART TITLE | 0 | 1 | NULL |
| 14 | 4 | 1 | E002 | 0 | 1 | NULL |
| 15 | 5 | 2 | CHAPTER TITLE | 0 | 1 | NULL |
| 16 | 6 | 2 | TEXT | 0 | 1 | NULL |

FIG. 15A

EDITING UNIT ID = 0, CLUSTER ID = 0

| LNo | NODE ORDER | MAXIMUM NODE ORDER |
|---|---|---|
| 0 | 0 | 4 |
| 1 | 1 | 3 |
| 2 | 2 | 3 |
| 3 | 3 | 3 |
| 4 | 4 | 4 |

FIG. 15B

EDITING UNIT ID = 1, CLUSTER ID = 1

| LNo | NODE ORDER | MAXIMUM NODE ORDER |
|---|---|---|
| 0 | 0 | 4 |
| 1 | 1 | 3 |
| 2 | 2 | 3 |
| 3 | 3 | 3 |
| 4 | 4 | 4 |

FIG. 15C

EDITING UNIT ID = 2, CLUSTER ID = 2

| LNo | NODE ORDER | MAXIMUM NODE ORDER |
|---|---|---|
| 0 | 0 | 6 |
| 1 | 1 | 3 |
| 2 | 2 | 3 |
| 3 | 4 | 6 |
| 4 | 5 | 6 |
| 5 | 3 | 3 |
| 6 | 6 | 6 |

FIG. 16

| CLUSTER ID | EDITING UNIT ID | VERSION | DOCUMENT ID |
|---|---|---|---|
| 0 | 0 | 1 | 0 |
| 1 | 1 | 1 | 0 |
| 2 | 2 | 1 | 0 |

```
<PART ID= "F04000000000000">
<TITLE ID= "F04000000000002" >READING= "PART TITLE"
<PARA ID= "F04000000000003" >PART TITLE</PARA>
</TITLE> &E002; </PART>
```

TO FIG.17B

```
<PART ID= "F04000000000000">
<TITLE ID= "F04000000000002" >READING= "PART HEADING"
<PARA ID= "F04000000000003" >PART HEADING</PARA>
</TITLE> &E002; </PART>
```

FIG. 19A

NODE TABLE

| SNo | LNo | EDITING UNIT ID | ELEMENT NAME | DOCUMENT ID | ADDED VERSION | DELETED VERSION | MOUNT POINT NUMBER |
|---|---|---|---|---|---|---|---|
| 3 | 0 | 1 | PART | 0 | 1 | NULL | 1 |
| 4 | 1 | 1 | TITLE | 0 | 1 | 1 | 0 |
| 5 | 2 | 1 | PARA | 0 | 1 | NULL | 0 |
| 17 | 5 | 1 | TITLE | 0 | 2 | NULL | 0 |

DELETED → (row SNo 4)
ADDED → (row SNo 17)

FIG. 19B

ATTRIBUTE TABLE

| SNo | ATTRIBUTE NAME | ATTRIBUTE VALUE |
|---|---|---|
| 3 | ID | F040000000000000 |
| 4 | ID | F040000000000002 |
| 4 | READING | PART TITLE |
| 5 | ID | F040000000000003 |
| 17 | ID | F040000000000002 |
| 17 | READING | PART HEADING |

ADDED → (SNo 17 ID row)
ADDED → (SNo 17 READING row)

FIG. 19C

TEXT TABLE

| SNo | LNo | EDITING UNIT ID | ELEMENT VALUE | DOCUMENT ID | ADDED VERSION | DELETED VERSION |
|---|---|---|---|---|---|---|
| 13 | 3 | 1 | PART TITLE | 0 | 1 | 1 |
| 14 | 4 | 1 | E002 | 0 | 1 | NULL |
| 18 | 6 | 1 | PARA HEADING | 0 | 2 | NULL |

DELETED → (SNo 13)
ADDED → (SNo 18)

FIG. 20

EDITING UNIT ID = 1,
CLUSTER ID = 3

| LNo | NODE ORDER | MAXIMUM NODE ORDER |
|---|---|---|
| 0 | 0 | 4 |
| 2 | 2 | 3 |
| 4 | 4 | 4 |
| 5 | 1 | 3 |
| 6 | 3 | 3 |

FIG. 21

| CLUSTER ID | EDITING UNIT ID | VERSION | DOCUMENT ID |
|---|---|---|---|
| 0 | 0 | 1 | 0 |
| 1 | 1 | 1 | 0 |
| 2 | 2 | 1 | 0 |
| 3 | 1 | 2 | 0 |

STRUCTURED DOCUMENT MANAGEMENT SYSTEM AND STRUCTURED DOCUMENT MANAGEMENT METHOD

BACKGROUND OF THE INVENTION

1. Field of the Invention

The present invention relates to a system and a method for managing structured documents in a searchable and an editable manner.

2. Description of the Related Art

Structured documents in such languages as Extensible Markup Language (XML) have been arranged into databases for searches by content or by document structure or for partial reuse. Documents of up to several pages are stored in a sufficiently effective fashion when simply put into files suitable for word searches only; larger documents are better utilized when arranged for searches by document structure, i.e., in a manner suitable for searches through the documents by partial structure or by attribute information attached to elements making up such structures. Documents may also be reused with their partial structures kept intact or may be edited in units of partial structures. Where a bulky document is to be edited in partial structures, plural workers may each work on a specific part of the document in a cooperative editing environment established for the occasion. In order to provide functions for implementing the above-described types of editing and reuse of structured documents, it is vital to arrange structured documents into databases.

One way to put a structured document into database format involves utilizing an existing relational database in which elements making up the structure of the document are each used as a record. In that case, the document structure is implemented by describing a parent-child relation of the elements using fields in each record. Various kinds of attribute information may be deployed in the fields. Since the relational database permits searches by field, specifying particular fields makes it possible to perform rapid searches by attribute information or by text. On the other hand, to search through structured documents requires successively tracking the fields that represent the parent-child relation of the elements. Every time a parent or a child element is to be referenced, it is necessary to acquire a new record. The need to frequently obtain new records generates repeated access to the database. Thus putting structured documents into a relational database turns out to be a singularly time-consuming, inefficient exercise in terms of searches by document structure.

Alternatively, structured documents may be regarded as a tree structure and expressed in a linked list. Data structures illustratively in a linked list format may be preserved in an object-oriented database and expanded into memory as needed for searches by document structure. In this case, it is easy to make rapid searches based on document structures. It should be noted, however, that attribute information about elements and other information such as contents attached to leaf elements need to be stored along with parent-child relation information about the elements. In making searches by use of such information, it is necessary to keep track of the document structures while referencing the information attached to each of the elements involved. That means searches based on attribute information or on contents are very inefficient and time-consuming.

Furthermore, partial editing of a document may cause changes in an element-to-element parent-child relation affecting the ancestor-descendant of the document as a whole and leading to numerous updates in the index being established. As a result, in the abovementioned cooperative editing environment where plural workers work jointly on a large document, responses to editing actions tend to be prolonged and ponderous. In particular, where document structures are preserved in a tree structure or as a linked list with a binary format index, structural changes cannot be made where desired because they would require reconstituting the entire index.

SUMMARY OF THE INVENTION

The present invention has been made in view of the above circumstances and provides a structured document management system and a structured document management method for managing structured documents in a manner convenient for high-speed searches by attribute information or by document structure and in such a way as to permit plural workers to make quick updates of any one document being jointly edited, whereby different versions of updated documents are managed with ease.

In carrying out the invention and according to one aspect thereof, there are provided a system and a method for managing a structured document whereby attribute information and content information about each of elements in the document are managed as records of a relational database and whereby relations between the elements are managed as binary format structural information. In such a setup, searches by attribute information are carried out at high speed by referencing fields in the relational database; searches by structure are also performed rapidly by referring to binary format structural information in memory. The binary format structural information may be managed as binary format files in the relational database. In that case, all information regarding structured documents may be managed in a unified fashion by use of relational database arrangements.

In a preferred variation according to the invention, an inputted structured document may be decomposed into plural partial structures based on predetermined settings; relations between the partial structures may be retained as binary format structural information; and element information and structural information about each of the decomposed partial structures may be retained. In this case, the effects of editing actions involving structural changes of any document can be limited to one or several partial structures of the document in question in terms of element information and structural information. For example, where plural workers jointly edit a document in a cooperative editing environment with each worker given a specific partial structure to work on, any one worker may update his or her assigned structure without affecting the partial structures assigned to the other workers.

Another preferred variation according to the invention may permit analyzing a difference between each of the elements in an unedited structured document previously retained on the one hand, and each of the elements in the newly edited and input structured document destined to replace the unedited document on the other hand; and retaining element information about any analyzed differences while generating and retaining structural information including the differences. This variation allows only edited differences to accumulate in order to implement document version management using the smallest possible storage capacity.

A further preferred variation according to the invention may, upon finding any element deleted as a result of analysis, furnish the record corresponding to the deleted element with version information in effect prior to the editing while generating an index reflecting the version information. This variation makes it easy to retrieve the elements with no version information attached thereto and regard them as components constituting the most recent structured document. It is thus possible to access easily and rapidly the latest structured document while carrying out appropriate version management.

Other purposes, features and advantages of the invention will become more apparent upon a reading of the following description and appended drawings.

BRIEF DESCRIPTION OF THE DRAWINGS

Preferred embodiments of the present invention will be described in detail with reference to the following figures wherein:

FIG. 1 is a block diagram of a preferred embodiment of this invention;

FIGS. 3A to 3D are explanatory views showing typical global structural information, element information, and structural information;

FIGS. 5A to 5D are explanatory views depicting typical data structures;

FIGS. 6A and 6B are explanatory views of a typical structured document to be inputted;

FIGS. 11A and 11B are tabular views giving typical element information (a node table and an attribute table);

FIG. 12 is a tabular view of typical element information (a text table);

FIGS. 15A to 15C are tabular views listing typical structural information;

FIG. 16 is a tabular view representing a typical version table;

FIGS. 19A to 19C are tabular views showing typical changes made in element information during document editing;

FIG. 20 is a tabular view showing typical changes made in structural information during document editing; and FIG. 21 is a tabular view showing typical changes in a version table during document editing.

DESCRIPTION OF THE PREFERRED EMBODIMENTS

Figure 2A:
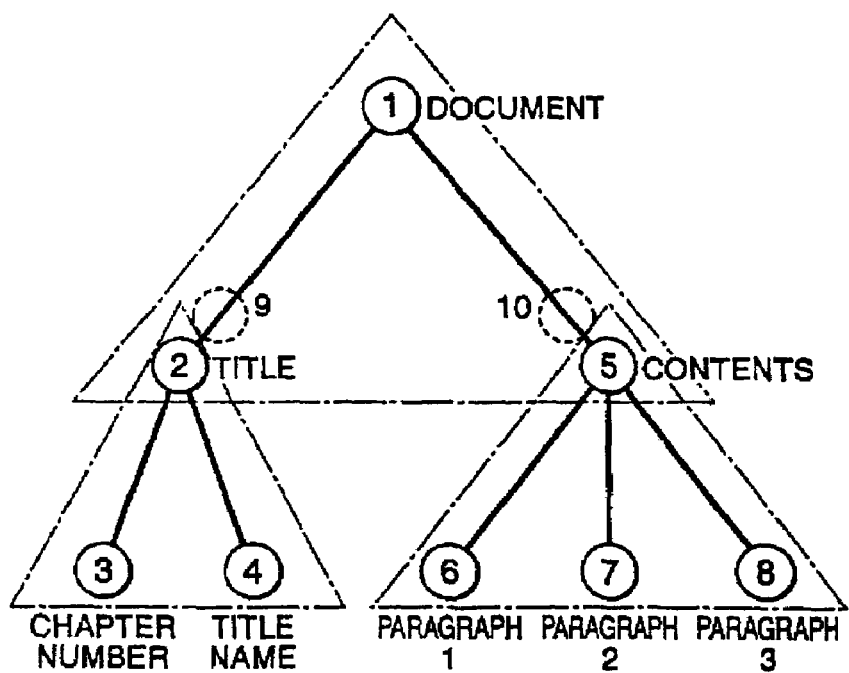
FIGS. 2A and 2B are explanatory views outlining typical structures of structured documents.

FIG. 1 is a block diagram of one preferred embodiment of this invention. In FIG. 1, reference numeral 1 stands for a document input unit; 2 for a file management unit; 3 for a dispatcher; 4 for a search unit; 5 for a document processing unit; 6 for a document analyzing unit; 7 for a document decomposition unit; 8 for an editing unit processing unit; 9 for a document analyzing unit; 10 for a difference analyzing unit; 11 for an element information registration unit; 12 for a structural information registration unit; and 13 for a relational database. The document input unit 1 inputs structured documents to the file management unit 2. Upon inputting a document, the document input unit 1 also enters a content type indicating whether the document to be inputted is an undecomposed structured document or a partial structure of a decomposed document. The document input unit 1 requests and receives a structured document or a partial structure thereof from the search unit 4 in the file management unit 2. The structured document or any of its partial structures thus received is edited before being inputted again to the file management unit 2. The document input unit 1 may also request various searches through structured documents.

The file management unit 2, made up of the dispatcher 3 and search unit 4, exchanges structured documents or partial structures thereof with the document input unit 1. The dispatcher 3 receives a structured document or a partial structure thereof from the document input unit 1 and forwards what is received according to the content type involved. That is, if the content type indicates a structured document yet to be decomposed into partial structures, the dispatcher 3 transfers the structured document to the document processing unit 5; if the content type indicates a partial structure having undergone decomposition, the dispatcher 3 transfers the partial structure to the editing unit processing unit 8. The dispatcher 3 also receives decomposed partial structures from the document processing unit 5 and transfers them to the editing unit processing unit 8. The search unit 4 retrieves a structured document or a partial structure thereof from the relational database 13 as requested by the document input unit 1, and transfers what is retrieved to the document input unit 1.

The document processing unit 5 analyzes the structured document received from the dispatcher 3 in the file management unit 2 and decomposes the received document into partial structures. The document processing unit 5 has the document analyzing unit 6 for analyzing structured documents, and document decomposition unit 7 for decomposing each structured document into plural partial structures in accordance with settings retrieved from the relational database 13. In a massive structured document, its decomposed partial structures serve as editing units. Decomposed partial structures are each provided with a content type which declares a partial structure and which is inputted to the file management unit 2. Relations between partial structures are registered at the relational database 13 as global structural information in a binary format.

The editing unit processing unit 8 stores the partial structures received from the file management unit 2 into the relational database 13. At this point, differences between edited partial structures on the one hand and unedited partial structures on the other hand are stored into the relational database 13 for use in document version management. The editing unit processing unit 8 includes the document analyzing unit 9, difference analyzing unit 10, element information registration unit 11, and structural information registration unit 12. The document analyzing unit 9 analyzes each partial structure received from the file management unit 2. Based on the result of analysis by the document analyzing unit 9, the difference analyzing unit 10 extracts a difference between each edited partial structure and the corresponding unedited partial structure retained in the relational database 13 and submits the difference for registration at the database 13. If received partial structures are judged to be those of a new structured document, all partial structures thus received are destined for registration at the relational database 13.

Upon registration of any new partial structure at the relational database 13, the element information registration unit 11 prepares a record with fields including attribute information and contents about each of the elements making up the partial structure and registers the record at the database 13. Of the elements involving differences, those newly added are registered anew, and those updated or deleted have their corresponding records furnished with version information that was in effect immediately before the editing. In the latter case, an index reflecting such version information is generated and stored into the relational database 13. As a result, the records with no version information attached thereto constitute latest-version records through which the most recent structured document is referenced with ease. In referencing a previous version of any structured document, a worker need only search for desired elements by use of the index reflecting the version in question.

Given a partial structure from the file management part 2, the structural information registration unit 12 turns relations between the elements of the structure into binary format structural information and registers the information thus generated at the relational database 13. If a given partial structure is judged edited, the structural information registration unit 12 reconstitutes structural information about the partial structure in question and registers the information anew at the database 13. Where a previous version of any structured document needs to be referenced, the structural information associated with the version in question will be referred to. While any partial structure having been edited requires reconstitution of its structural information, the fact that decomposed partial structures are independent of one another allows each partial structure to be updated without affecting any other structures. Structural information can thus be reconstituted at high speed.

The relational database 13 is a known relational database that stores as records such information as element information about the elements of each structured document, global structural information about the relations between partial structures, and structural information about the relations between the elements of each partial structure. Structured documents are retained by use of these kinds of information.

Figure 2B:
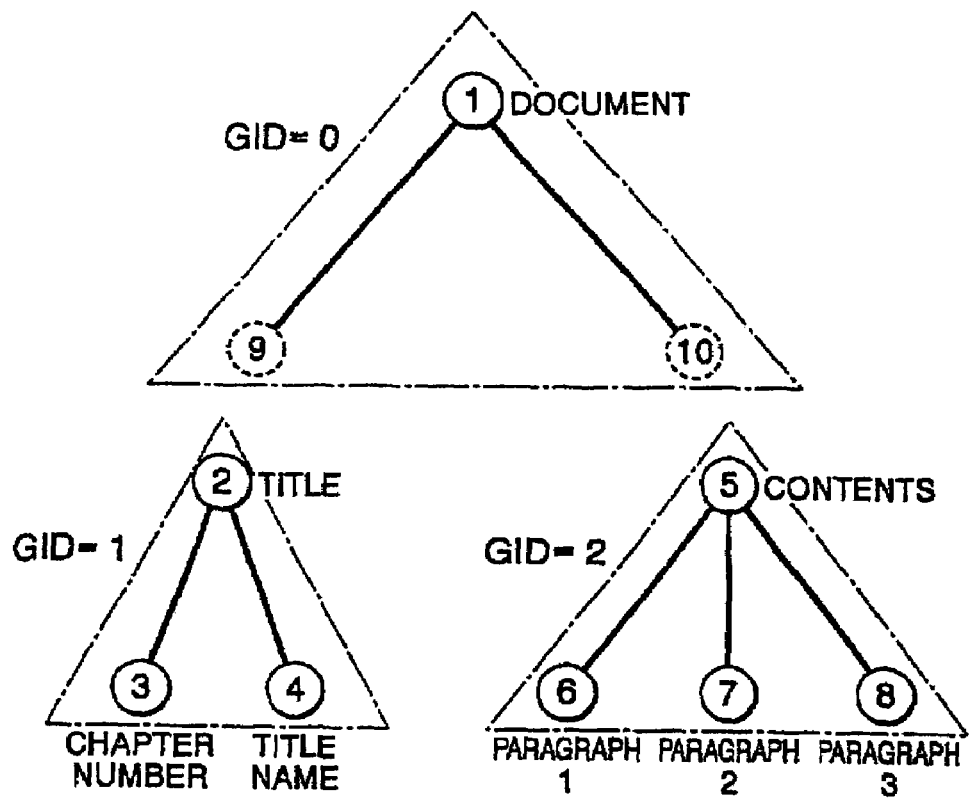

How the above-described embodiment of the invention typically works is outlined below. FIGS. 2A and 2B are explanatory views outlining typical structures of structured documents, and FIGS. 3A to 3D are explanatory views showing typical global structural information, element information, and structural information. Consider the case where a three-layer structured document is inputted as shown in FIG. 2A. Structured documents such as this are each decomposed into partial structures automatically according to a designated tag or attribute, as in this example, or based on a structural depth. Each element is indicated using a circle, and each encircled numeral represents a SNo identifying a specific element.

When the structured document shown in FIG. 2A is input along with a content type, the dispatcher 3 transfers the inputted structured document to the document processing unit 5 in accordance with the content type.

In the document processing unit 5, the document analyzing unit 6 analyzes the structured document received. According to settings read from the relational database 13, the document decomposition unit 7 decomposes the document into plural partial structures. Illustratively, the structured document having three portions shown triangle-shaped in FIG. 2A is decomposed into three partial structures as depicted in FIG. 2B. The decomposed partial structures are sent back to the dispatcher 3 in the file management unit 2.

Upon decomposition of the document into partial structures, global structural information which represents relations between the partial structures is generated in a binary format and stored into the relational database 13. The three decomposed partial structures shown in FIG. 2B are assigned global identification numbers (GIDs) 0, 1 and 2 respectively. If parent GIDs alone are retained as structural information for the purpose of simplification and illustration, they constitute a data array as shown in FIG. 3A, the parent GIDs representing the respective partial structures. Such a memory image is embedded as a field into each record within the relational database 13 along with a document ID for uniquely identifying the corresponding document.

Where a structured document is decomposed into partial structures, the root element of a given partial structure is included in the partial structure immediately above in hierarchical terms. Illustratively, in the example of FIGS. 2A and 2B, the elements with sequence numbers (SNos) 2 and 5 span two partial structures each. In such a case, the upper partial structure is furnished with dummy elements. In this example, the partial structure with the GID of 0 has its elements of SNos 2 and 5 replaced by virtually added elements of SNos 9 and 10 respectively.

Where a structured document is decomposed into partial structures, the root element of a given partial structure is included in the partial structure immediately above in hierarchical terms. Illustratively, in the example of FIGS. 2A and 2B, the elements with sequence Nos. 2 and 5 span two partial structures each. In such a case, the upper partial structure is furnished with dummy elements. In this example, the partial structure with the GID of 0 has its elements of sequence Nos. 2 and 5 replaced by virtually added elements of sequence Nos. 9 and 10 respectively.

Upon receipt of a partial structure decomposed by the document decomposition unit 7, the dispatcher 3 forwards the received structure to the editing unit processing unit 8. In the editing unit processing unit 8, the document analyzing unit 9 analyzes the partial structure before handing it over to the difference analyzing unit 10. Since the input structured document in this example is a new document, the difference analyzing unit 10 transfers the received partial structure to the element information registration unit 11 and structural information registration unit 12.

The element information registration unit 11 prepares information about each of the elements in the partial structure and registers the information as element information at the relational database 13. Illustratively, in the case of the partial structure with the GID of 2 shown in FIG. 2B, information about each of the elements numbered 5 through 8 is registered at the relational database 13. FIG. 3B lists typical element information. In this table, the SNos identifying the elements are listed in association with field values made up of location numbers (LNos) designating the elements within the partial structure, element names, attribute values, deleted version information, and added version information. Naturally the fields may be arranged in any way desired. Although the listed element information shows no parent-child relation between elements, it is possible to perform high-speed searches by field values such as the attribute value. The element information may be associated with structural information, to be described later, illustratively by use of LNos or SNos.

The structural information registration unit 12 generates, in a binary format, structural information representing relations between the elements in each partial structure. Although the example of FIG. 3C shows structural information having the parent LNos of the elements arranged into a data array, the structural information in a binary format may take any data structure. A memory image of such structural information is embedded as a field into each record within the relational database 13 along with a cluster ID for uniquely identifying the corresponding partial structure. Cluster IDs are linked with GIDs in a version table as shown in FIG. 3D. Where structural information is reconstituted as a result of editing, other cluster IDs are used to establish linkage with GIDs to prevent changes in the global structural information, as will be described later.

For the purpose of illustration, FIGS. 3B and 3C indicate only element information and structural information about the partial structure having the GID of 2. Similar element information and structural information are also prepared about the partial structures with the GIDs of 0 and 1 and are stored into the relational database 13.

Where a structured document held in the relational database 13 is to be edited, the partial structures making up the document in question serve as editing units. When the file management unit 2 is requested to retrieve a partial structure from the relational database 13, the search unit 4 reads the partial structure of interest from the relational database 13 for output to the document input unit 1. After being edited, the partial structure is again input to the file management unit 2.

The edited partial structure inputted to the file management unit 2 (along with a content type) is forwarded by dispatcher 3 to the editing unit processing unit 8. In the editing unit processing unit 8, the document analyzing unit 9 analyzes the partial structure and hands the analyzed document over to the difference analyzing unit 10. The difference analyzing unit 10 compares the edited partial structure received from the document analyzing unit 9 with the corresponding unedited partial structure held in the relational database 13, and extracts any difference that may exist between the two structures. Editing of elements in the partial structure may involve changing contents or attribute values, adding new elements, or deleting elements. If any new element is added, the element information registration unit 11 registers element information about the new element at the relational database 13. At this point, version information in effect upon the addition may also be registered. If any element is deleted, the element information registration unit 11 attaches version information about the deleted element to the corresponding element information. Where any element is changed, the element information in effect prior to the editing is deleted and element information in effect thereafter is added.

Figures 4A, 4B, 4C:
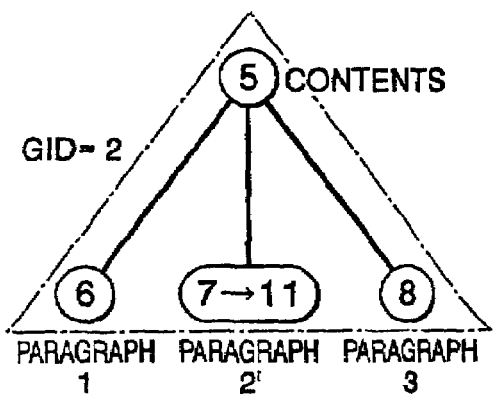
FIGS. 4A to 4C are explanatory views indicating typical edited element information of partial structures.

FIGS. 4A to 4C are explanatory views indicating typical edited element information of partial structures. In relation to the partial structure shown as GID2 in FIG. 2B, if an element of SNo 7 is changed as shown in FIG. 4A, the edited element is added along with a new SNo of 11 while the unedited element with the old SNo of 7 in effect before the editing is deleted. That is, as shown in FIG. 4B, a deleted version field for the element information of SNo 7 is given the unedited version number, and an added version field for the element information of SNo 11 is assigned the current version number. A version table such as one in FIG. 4C is prepared as an index wherein cluster IDs, GIDs and version information are associated with one another. The version table establishes linkage between information about partial structures in global structural information on the one hand, and information within the partial structures being changed from one version to another on the other hand.

When such differences alone are allowed to accumulate, the growing amount of data in the relational database 13 is minimized. If information about any deleted element is matched with deleted version information, the latest structured document (or any partial structure thereof) is acquired by simply retrieving the element information with no deleted version number attached thereto. This makes it possible to obtain the structured document of the most recent version easily and quickly.

Where a partial structure has been edited, not only the element information but also the structural information need to be updated. A structural information update is carried out by the structural information registration unit 12 reconstituting the structural information about the partial structure as a whole. In that case, the structural information to be reconstituted is limited to the partial structure of interest. The process involved is much faster and smaller in scale than the conventional process of reconstituting the structural information about the entire structured document. The partial structure of interest can be updated without affecting other partial structures that may be currently edited by other workers.

Although the global structural information, element information and structural information in FIGS. 3A through 4C are shown in presently preferred typical data structures, any other desired data structures may be adopted in designing a relational database 13. In an example that follows, data structures will be made partially different from those indicated in FIGS. 3A through 4C.

The workings of the above-described embodiment will now be described in more detail. FIGS. 5A to 5D are explanatory views depicting typical data structures. Explained below is how global structural information, element information and structural information are illustratively stored into and retrieved from the relational database 13 by use of the data structures shown in FIGS. 5A through 5D.

As shown in FIG. 5A, global structural information includes such data pieces as a maximum GID, a parent GID, a parent connection ID, and an editing unit ID about each of the partial structures involved. These data pieces are arrayed in the order of GIDs regarding the partial structures. The GIDs are assigned consecutively to the partial structures that are to be searched on a depth priority, left priority basis starting from a root node. The GIDs are assigned to the partial structures in the same manner as node orders assigned to the elements of the partial structures in the structural information, as will be described later. How the GIDs are assigned will be explained by analogy with the node orders to be subsequently described. The maximum GID signifies the largest of the GIDs for the partial structures that come hierarchically under the partial structure of interest. Because the GIDs are arranged on a depth priority basis, the partial structures below the partial structure in question are assigned GIDs ranging from the GID of the partial structure of interest to the maximum GID. It is guaranteed that no GID larger than the maximum GID exists below the partial structure in question. The parent GID refers to the GID of a partial structure that is parental to the partial structure of interest. The parent connection ID indicates, in the example of FIG. 2B, one virtually added element to which the partial structure with the GID of 1 is connected among those dummy elements attached to the partial structure having the GID of 0. The editing unit ID is an ID for uniquely identifying the partial structure of interest in the entire system. These data pieces are arrayed as many as the number of the GIDs involved. Each data piece represents a single field value in a binary format within a record. The record also includes other fields such as a document ID, so that relations between the partial structures of the document in question are retained in the relational database 13. More specifically, the global structural information is registered in association with document IDs at the relational database 13 as BLOB (binary large object) data, a data type allowing binary format data to be stored unmodified.

The element information is constituted by a node table, an attribute table and a text table as shown in FIG. 5B. Of the elements, those that will become leaf nodes are furnished with text table information; the other elements are provided with node table information and attribute table information. There can be many preferred table arrangements such as one in which a node table and an attribute table are arranged into a single table.

A typical node table has such fields as a SNo field, a LNo field, an editing unit ID field, an element name field, a document ID, an added version information field, a deleted version information field, and a mount point count field. The SNo is a unique ID assigned to each of the elements throughout the system as a whole. The LNo is a unique ID assigned to each of the elements in a given partial structure. The LNos exist independent of the document structure. The editing unit ID identifies the partial structure that contains the element of interest. Element names are self-explanatory and indicative of the names of the elements in the document. The document ID identifies the document that contains the element of interest. Added version information indicates the version of the document to which the element in question has been added. The added version information is set to 1 when a new document is registered. Deleted version information indicates the version of the document in effect immediately before the element in question was deleted. The deleted version information is set for null when a new document is registered. If the element is deleted illustratively in the first update, then the deleted version information is set to 1. The mount point count indicates the number of mount points connected to elements hierarchically lower than the element of interest (i.e., descendants). A mount point refers to a virtually established element such as one of those in the partial structure in FIG. 2B having the GID of 0. For the element having the SNo 1, the mount point count is 2. A typical attribute table has such fields as a SNo field, an attribute name field, and an attribute value field. The SNo in the attribute table is the same as its counterpart in the node table. The attribute name is a name attached to the attribute of the element in question. The value of the element of interest is stored as the attribute value.

A typical text table has such fields as a SNo field, a LNo field, an editing unit ID field, an element value field, a document ID field, an added version information field, and a deleted version information field. The element value field is provided with a document content belonging to each element that will become a leaf node. Illustratively, the elements added virtually to the partial structure having the GID of 0 in FIG. 2B are to become leaf nodes in the partial structure in question. In this case, a connection ID is written as the element value. The other fields are the same as their counterparts discussed above.

The structural information, as shown in FIG. 5C, is made up of a LNo, a node order, and a maximum node order about each of the elements in a given partial structure. The LNo was discussed above. The node order signifies an ID assigned consecutively to each of the elements that are to be searched on a depth priority, left priority basis starting from a root element in the partial structure of interest. The maximum node order refers to the largest of the node orders for the elements that come hierarchically under the element of interest in the partial structure. Because the node orders are arranged on a depth priority basis, the elements below the element in question are assigned IDs ranging from the node order of the element of interest to the maximum node order. It is guaranteed that no ID larger than the maximum node order exists below the element in question. These data pieces are arrayed as many as the number of the elements (including those virtually established) that exist in the partial structure. Each data piece represents a single field value in a binary format within a record. The record also includes other fields such as a cluster ID, so that relations between the partial structures of the document in question are retained as a binary format file in the relational database 13. The cluster ID is an ID for identifying each partial structure in the same manner as the editing unit ID. Because structural information is reconstituted every time a document is updated to a new version by editing, a new cluster ID is attached to the partial structure of each new version.

A typical version table has such fields as a cluster ID field, an editing unit ID field, a version information field, and a document ID field as shown in FIG. 5D. The version table establishes linkage between the editing unit ID attached to each partial structure in the global structural information on the one hand, and the structural information representing that document structure in the partial structure which differs from one version to another on the other hand. Information pointing to the latest version of each document is separately retained. When the most recent document is to be retrieved, referring to the version table based on the latest version information corresponding to the document in question yields the latest structural information about each partial structure. For retrieval by attribute information, retrieving the records with their deleted version information set for null provides the most recent element information.

FIGS. 6A and 6B are explanatory views of a typical structured document to be inputted. It is assumed here that the structured document of FIG. 6A described in XML is inputted from the document input unit 1. This structured document may be expressed in a tree structure shown in FIG. 6B. Each element in the structure is indicated using a circle, and each encircled numeral represents a SNo.

When this structured document is inputted from the document input unit 1, the dispatcher 3 transfers the input structured document to the document processing unit 5. In the document processing unit 5, the document analyzing unit 6 analyzes the structured document received. According to settings read from the relational database 13, the document decomposition unit 7 decomposes the document into plural partial structures. In this example, the structured document is decomposed by PART and by CHAPTER.

Figures 7A, 7B:
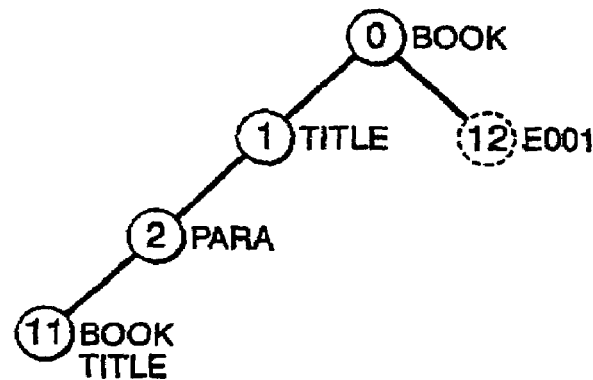
FIGS. 7A and 7B are explanatory views showing a typical document in a decomposed partial structure (editing unit ID=0)
Figures 8A, 8B:
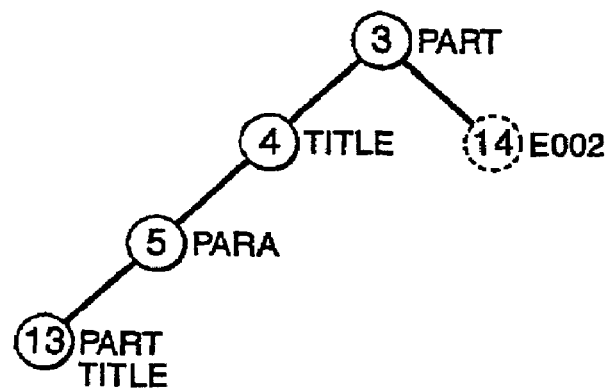
FIGS. 8A and 8B are explanatory views showing another typical document in a decomposed partial structure (editing unit ID=1)
Figures 9A, 9B:
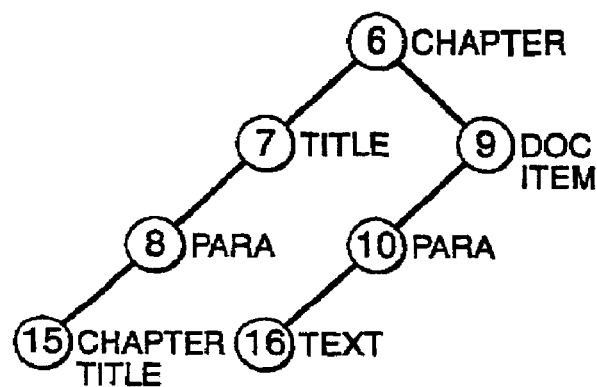
FIGS. 9A and 9B are explanatory views showing another typical document in a decomposed partial structure (editing unit ID=2)

FIGS. 7A through 9B are explanatory views showing typical documents in decomposed partial structures. Figures with the suffix A suffix B indicate a tree structure of a decomposed partial structure each. In the description that follows, it is assumed that the partial structure in FIGS. 7A and 7B has the editing unit ID of 0, that the partial structure in FIGS. 8A and 8B has the editing unit ID of 1, and that the partial structure in FIGS. 9A and 9B has the editing unit ID of 2. Apart from the editing unit IDs, the partial structures are given a GID each. Illustratively, the partial structure in FIGS. 7A and 7B is given the GID of 0, the partial structure in FIGS. 8A and 8B is assigned the GID of 1, and the partial structure in FIGS. 9A and 9B is provided with the GID of 2.

The partial structure shown FIGS. 7A and 7B is furnished upon decomposition with a virtual element (SNo=12) corresponding to the element of SNo 3 in FIG. 6B. In the description of the document in FIG. 7A, that portion of the description which is moved to other partial structures through decomposition is shown replaced with a description "&E001;" which constitutes a connection ID. The same applies to the partial structure in FIGS. 8A and 8B to which is added a virtual element (SNo=14) corresponding to the element of SNo 6 in FIG. 6B. In the description of the document in FIG. 8A, that portion of the description which is moved to other partial structures upon decomposition is shown replaced with a description "&E002;" that makes up a connection ID.

Figures 10A, 10B:
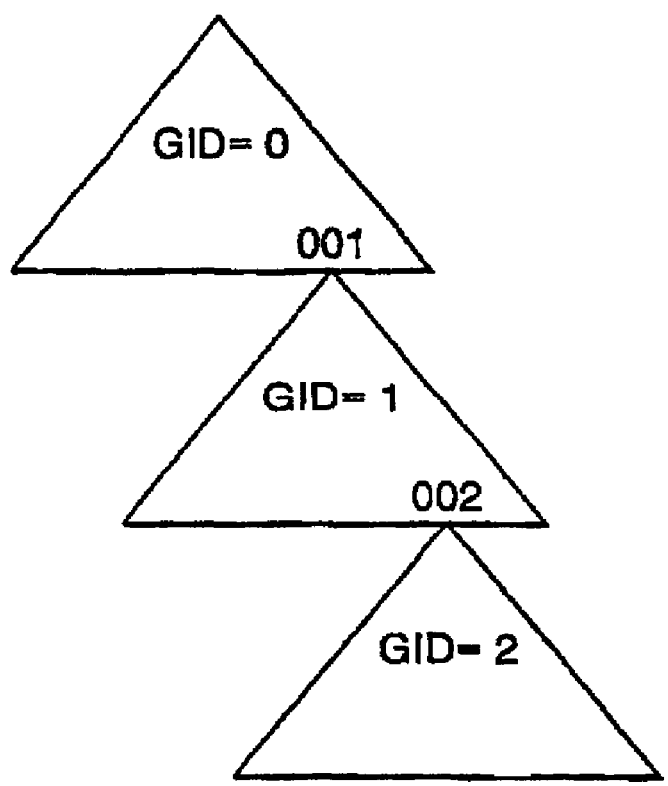
FIGS. 10A and 10B are explanatory views illustrating typical global structural information.

FIGS. 10A and 10B are explanatory views illustrating typical global structural information. When a structured document is decomposed into partial structures as discussed above, the relations between the partial structures are acquired at that point and are expressed illustratively in a tree structure as shown in FIG. 10B. In FIG. 10B, the partial structures are each indicated as a triangle. A numeral contained in each triangle signifies a GID.

The relations between the partial structures are registered at the relational database 13 as global structural information. Illustratively, the global structural information appears as shown in FIG. 10A. The partial structure with the GID of 1 is connected to the virtually established element (SNo=12) in the partial structure having the GID of 0. In that case, only the numeric part of the connection ID ("&E001;") is included as a parent connection ID in the global structural information. The same applies to the partial structure with the GID of 2; only the numeric part of the connection ID ("&E002;") for the virtually established element (SNo=14) in the partial structure having the GID of 1 is included as a parent connection ID in the global structural information.

Such global structural information is registered in association with document IDs at the relational database 13 as BLOB data, a data type allowing binary format data to be stored unmodified as mentioned earlier. The descriptions of the partial structures in FIGS. 7A, 8A and 9A are sent back to the file management unit 2. The dispatcher 3 in the file management unit 2 transfers the descriptions of the decomposed partial structures to the editing unit processing unit 8. In the editing unit processing unit 8, the document analyzing unit 9 analyses the description of each partial structure before transferring what is analyzed to the difference analyzing unit 10. On finding the received description to be a new structured document, the difference analyzing unit 10 transfers the result of partial structure analysis by the document analyzing unit 9 to the element information registration unit 11 and structural information registration unit 12.

The element information registration unit 11 generates element information based on the descriptions of the partial structures. In accordance with the data structure of the element information in FIG. 5B, the element information registration unit 11 generates a text table for the elements (including those virtually added) corresponding to leaf nodes while creating a node table and an attribute table for the other elements. FIGS. 11A, 11B and 12 are tabular views giving typical element information. FIGS. 11A, 11B and 12 give a node table, an attribute table and a text table respectively. Although the tables in FIGS. 11A, 11B and 12 are shown already furnished with SNos for the purpose of illustration, these numbers are actually assigned to the elements in the order in which they appear when the descriptions of the partial structures are input to the editing unit processing unit 8 for analysis. LNos are assigned to the elements in each partial structure regardless of the document structure. For an added version, the added version information is set to 1 upon new registration; for a deleted version, the deleted version information is set for null upon new registration. The mount point count is set to 1 for the elements which have SNo 0 or 3 and to which virtual elements (SNo=12, 14) are connected in a hierarchically subordinate fashion; the mount point count is set to 0 for the other elements. Such element information is registered at the relational database 13.

Figure 13:
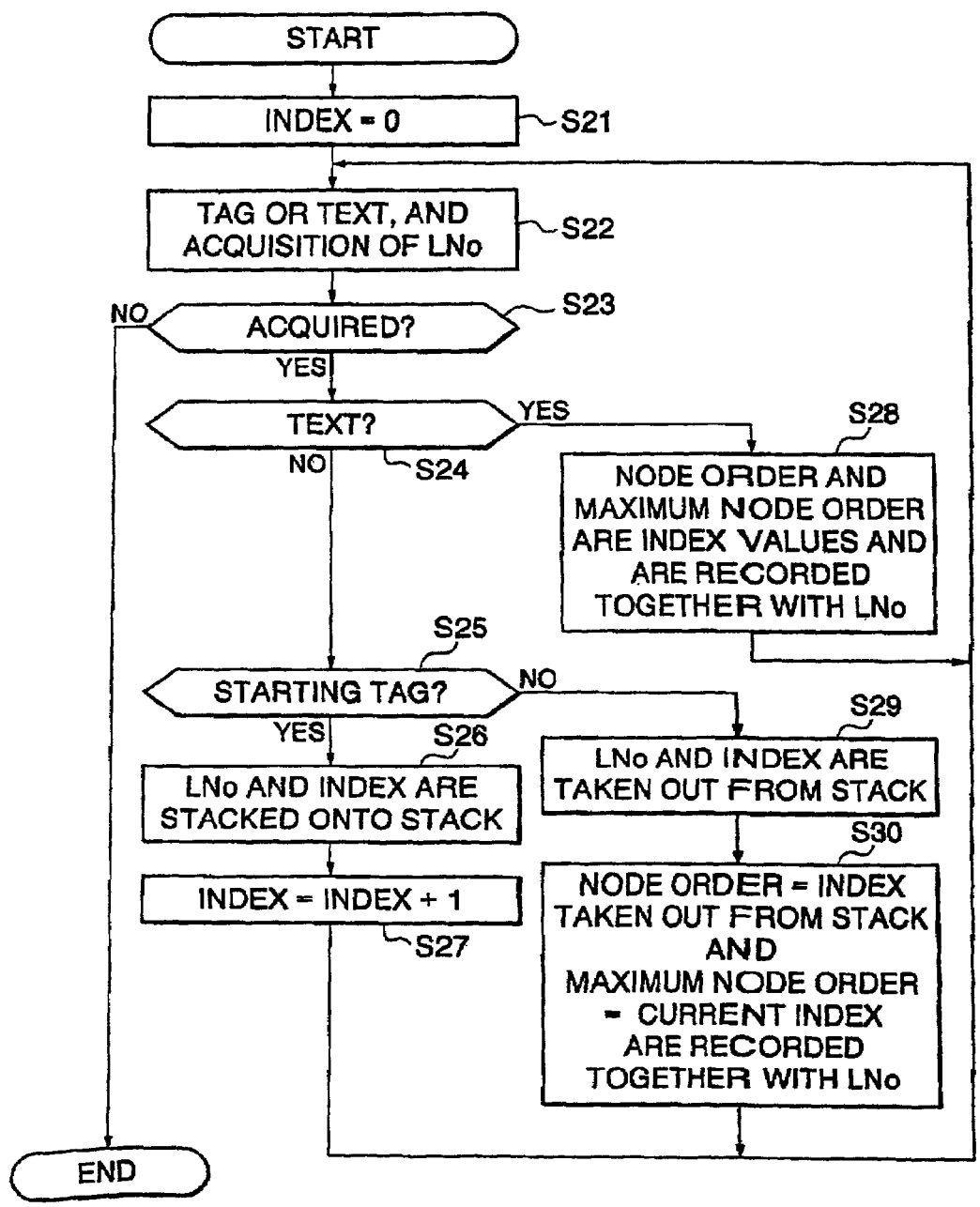
FIG. 13 is a flowchart of steps constituting a typical process of generating structural information.

The structural information registration unit 12 generates, in a binary format, structural information representing the relations between the elements in each partial structure. In accordance with the data structure of the element information in FIG. 5C, the structural information registration unit 12 obtains the LNo, node order and maximum node order of each of the elements involved. FIG. 13 is a flowchart of steps constituting a typical process of generating structural information. In this process, tags and texts in XML are extracted successively and processed individually, with LNos acquired separately. In performing the process, a stack arrangement is used to accommodate LNos and index numbers.

In step S21 of FIG. 13, the index is initialized to 0. In step S22, either a tag or a text is extracted and a LNo is obtained. In step S23, a check is made to see whether any tag or text exists. If neither a tag nor text is judged to exist with the description of the partial structure coming to an end, then the process is terminated.

In step S24, a check is made to see if the extracted element is text. If the extracted element is judged to be a tag, step S25 is reached. In step S25, a check is made to determine whether the tag is a start tag or an end tag. If the extracted element is judged to be a start tag, step S26 is reached. In step S26, the LNo obtained in step S22 and the current index are pushed onto the stack. In step S27, the index value is incremented by 1.

If the extracted element is judged to be a text, step S28 is reached. In step S28, the node order and the maximum node order are set for the current index value, and the LNo, node order and maximum node order are written to a structural information location corresponding to the LNo acquired in step S22.

If the extracted element is judged to be an end tag, step S29 is reached. In step S29, the LNo and index value are taken out from the stack. In step S30, the node order is set for the index value taken out from the stack and the maximum node order is set for the current index value, and the LNo, node order and maximum node order are written to a structural information location corresponding to the LNo taken out from the stack.

Figure 14:
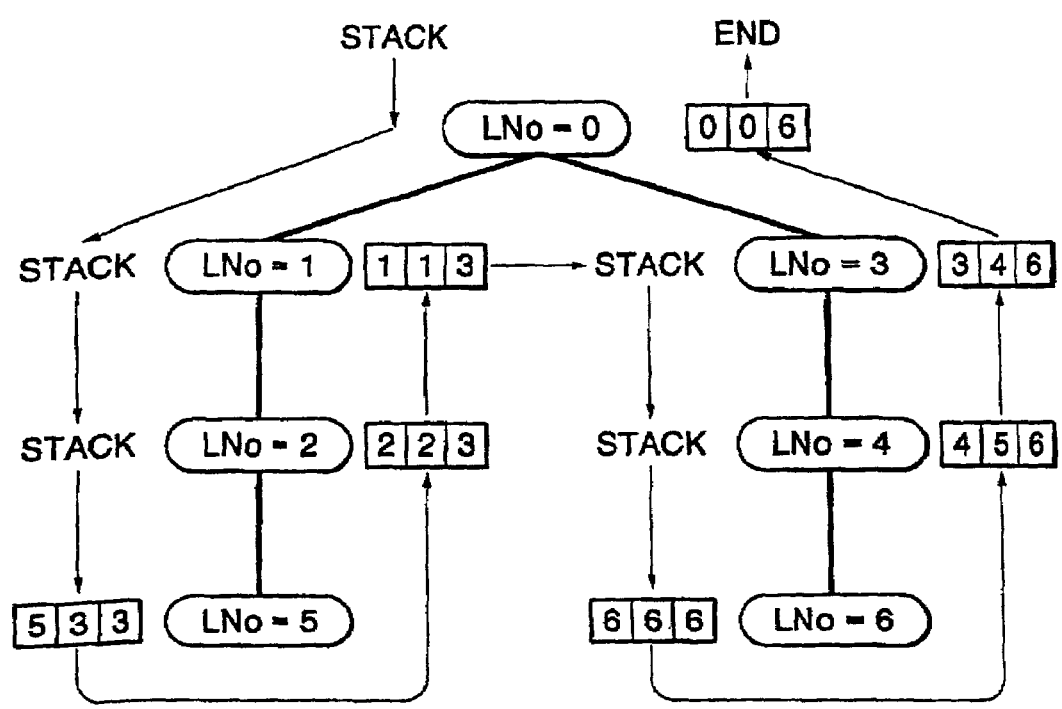
FIG. 14 is an explanatory view illustrating a typical process of generating structural information about a partial structure having the editing unit ID of 2.

After the steps described above, the elements are numbered successively with node orders as the elements are being searched on a depth priority, left priority basis. FIG. 14 is an explanatory view illustrating a typical process of generating structural information about a partial structure having the editing unit ID of 2. As shown in FIGS. 11A, the elements are each assigned a LNo. The LNos are allocated regardless of the document structure. The steps in FIG. 13 are carried out on the basis of the description in XML having the editing unit ID of 2 as shown in FIG. 9A. Three-digit numbers enclosed by rectangles in FIG. 14 each contain three values: a LNo, a node order, and a maximum node order arrayed from left to right.

The LNos 0, 1 and 2 are stacked onto the stack along with the corresponding index values (0, 1, 2). For a leaf node element of local No. 5, the LNo 5, node order 3, and maximum node order 3 are stored as structural information. The LNo 2 and the index value 2 are taken out from the stack, and the LNo 2, node order 2 and maximum node order 3 are stored as structural information. Furthermore, the LNo 1 and index value 1 are taken out from the stack, and the LNo 1, node order 1 and maximum node order 3 are stored as structural information.

The LNos 3 and 4 are stacked onto the stack along with the corresponding index values 4 and 5. For a leaf node element of local No. 6, the LNo 6, node order 6, and maximum node order 6 are stored as structural information. The LNo 4 and the index value 5 are taken out from the stack, and the LNo 4, node order 5 and maximum node order 6 are stored as structural information. The LNo 3 and index value 4 are then taken out from the stack, and the LNo 3, node order 4 and maximum node order 6 are stored as structural information. Furthermore, the LNo 0 and index value 0 are taken out from the stack, and the LNo 0, node order 0 and maximum node order 6 are stored as structural information.

FIGS. 15A, 15B and 15C are tabular views listing typical structural information. Carrying out the steps described above yields structural information about each of the partial structures involved as shown in FIGS. 15A to 15C. Illustratively for the partial structure with the editing unit ID of 2, the structural information shown in FIG. 15C is obtained by the process discussed above with reference to FIG. 14. Although the structural information is expressed in tabular form in FIGS. 15A through 15C, the data pieces making up the tables are handled as so-called BLOB data in a binary format and are each given a cluster ID when stored into the relational database 13.

FIG. 16 is a tabular view representing a typical version table. In the version table, each different version is matched with an editing unit ID and a cluster ID. Since this example involves registering a new document, three records are generated for each partial structure with its version information set to 1 as shown in FIG. 16. These records are written to the relational database 13.

As described above, the structured document shown in FIGS. 6A and 6B is decomposed into partial structures as indicated in FIG. 7. The decomposition entails generating global structural information indicating the relations between the partial structures, element information about the elements making up the document, structural information indicating the relations between the elements in the partial structures, and a version table designed for editing. The information and table thus generated are registered at the relational database 13.

How a structured document is typically edited will now be described. Editing work is carried out in units of partial structures. Illustratively, an editing unit ID is designated for the search unit 4. In turn, the search unit 4 searches the relational database 13 for the element information and structural information corresponding to the designated editing unit ID and retrieves the information of interest. The retrieved information is converted illustratively to XML format before being offered to a worker for editing. The worker edits the corresponding partial structure, and inputs the edited partial structure again to the file management unit 2.

Figures 17A, 17B:
FIGS. 17A and 17B are explanatory views showing contents of an edited document.

FIGS. 17A and 17B are explanatory views showing contents of an edited document. It is assumed that editing work is done on the partial structure having the editing unit ID of 1 shown in FIG. 8A. FIG. 17A indicates an unedited description identical to what is shown in FIG. 8A. Suppose that the unedited description is edited into a description given in FIG. 17B. In the edited description, the tag "TITLE" has a different attribute value and the text expressing the title name is changed.

When the file management unit 2 admits the description of the edited partial structure shown in FIG. 17B, the dispatcher 3 transfers the description to the editing unit processing unit 8. The description of the edited partial structure is analyzed by the document analyzing unit 9 before being handed over to the difference analyzing unit 10. The difference analyzing unit 10 compares the elements of the unedited partial structure with the elements of the edited partial structure, extracts inserted and deleted elements as differences, and causes the element information registration unit 11 and structural information registration unit 12 to modify element information, structural information, and version table entries to reflect the extracted differences.

Figure 18:
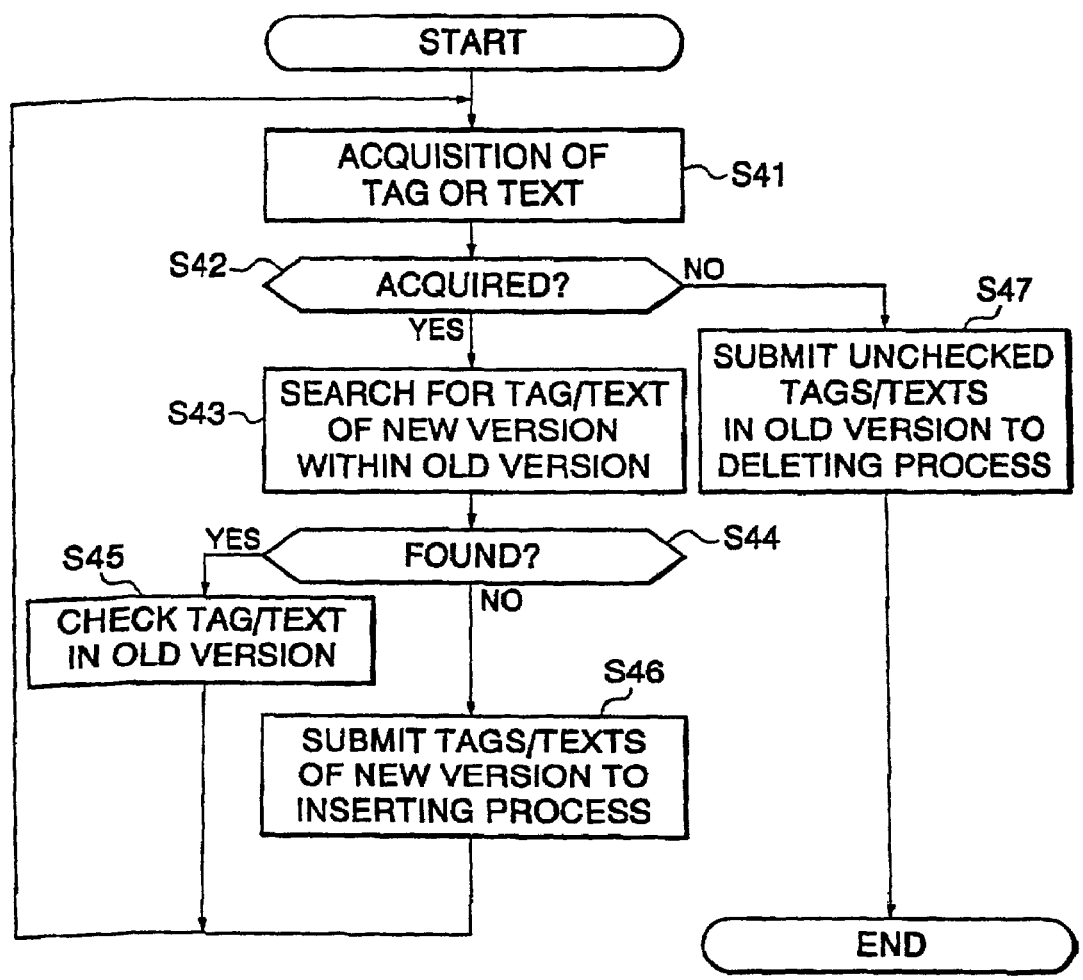
FIG. 18 is a flowchart of steps constituting a typical process of difference management performed by a difference analyzing unit 10 of the embodiment.

FIG. 18 is a flowchart of steps constituting a typical process of difference management performed by the difference analyzing unit 10. It is assumed here that tags or texts are extracted one by one by the document analyzing unit 9 and transferred to the difference analyzing unit 10. In step S41 of FIG. 18, the difference analyzing unit 10 acquires a tag or text extracted by the document analyzing unit 9. In step S42, a check is made to see if any tag or text has been obtained.

If in step S41 a tag or text is judged acquired, step S43 is reached. In step S43, a search is carried out for the tag or text in the unedited old version. The search can be performed at high speed by obtaining a hash code from the tag or text and using the obtained code as a basis for the search.

In step S44, a check is made to see whether the tag or text acquired in step S41 is found in the unedited old version. If the same tag or text is judged to exist in the unedited old version, then the tag or text is regarded as unedited and step S45 is reached. In step S45, the corresponding tag or text in the unedited old version is given a check each. This prevents duplicate element linkage and helps extract the deleted tags and texts. The check in step S45 is followed by step S41 and the next tag or text is processed.

If in step S44 the tag or text obtained in step S41 is not judged to exist in the unedited old version, then step S46 is reached. In step S46, the tag or text acquired in step S41 is regarded as a newly inserted tag or text and processed as such. The inserting process involves generating and registering element information anew. At this point, information about the new version is registered as added version information. After the inserting process, step S41 is reached again and the next tag or text is processed.

When all tags and text in the inputted description of the edited partial structure have been processed as described above, step S47 is reached. In step S47, all unchecked elements in the unedited old version are regarded as deleted and processed as such. The deleting process involves registering old version information as the deleted version information for the element information in question. It should be noted that the deleting process does not actually erase the element information.

As described, when a given partial structure is edited, any differences between the edited version and the old version are extracted, and information only about the extracted differences is registered at the relational database 13.

FIGS. 19A to 19C are tabular views depicting typical changes made in element information during document editing. These tables show information only about the elements included in the partial structure with the editing unit ID of 1. Illustratively, if the description of the partial structure in FIG. 17A is changed to what is shown in FIG. 17B as discussed above, then element information about the tag "TITLE" and element information about the title name are registered anew, and the information about the unedited old elements corresponding to those edited is deleted. More specifically, element information corresponding to the edited element of SNo 17 is added to the node table, and the deleted version field in the element information for SNo 4 is changed from null to 1 in the table. In the attribute table, attribute information about the added element of SNo 17 is added. In the text table, element information corresponding to the edited text having SNo 18 is added, and the deleted version field in the element information for SNo 13 is changed from null to 1.

FIG. 20 is a tabular view indicating typical changes made in structural information during document editing, and FIG. 21 is a tabular view showing typical changes in the version table during document editing. After a given partial structure is edited as described above, the structural information registration unit 12 reconstitutes structural information about the partial structure in question. The structural information is reconstituted in the same manner as in the above-described new registration. As a result, the partial structure with the editing unit ID of 1 has relevant structural information generated as shown in FIG. 20, and the structural information is registered at the relational database 13. At this point, a cluster ID different from that in the structural information for the old version is provided. In this example, a cluster ID of 3 is furnished.

With the structural information retained in a binary format as mentioned above, editing a partial structure requires reconstituting the structural information. However, the scope of structural information reconstitution is limited to the actually edited partial structure among the partial structures decomposed from a given structured document. Therefore the effect of the editing on the entire document is minimized, and the time required to reconstitute the structural information is shortened significantly.

When a new version of a document is registered following editing work, the version table for the edited document is updated accordingly. As shown in FIG. 21, the version table is supplemented with a record associating the new version with a cluster ID corresponding to the structural information generated for the new version.

As described, individually edited partial structures have their element information and structural information updated individually. Information is retained about the added version and the deleted version of each element. This arrangement allows elements in any partial structure of any version to be retrieved as needed. In particular, elements in a partial structure of the latest version are obtained by simply retrieving the element information having the deleted version information set for null. That is, a condition "The field value of the deleted version should be null" need only be added to the conditions of search through the relational database 13 for the elements of the latest version. Since retrieval of elements from the most recent version is a frequently performed process, speeding up this process contributes appreciably to users' convenience.

Explained above are the preferred system and method for decomposing a structured document into partial structures, and registering the document at the relational database 13 for management based on three factors: global structural information in a binary format representing the relations between the partial structures of the document, element information about the elements in the partial structures, and structural information in a binary format indicating the relations between the elements in the partial structures. Alternatively according to the invention, structured documents need not be decomposed into partial structures; the structured document may be managed simply in terms of element information and binary format structural information. This also permits rapid searches through the structured document by attribute, by content or by document structure, which is a specific effect of the present invention.

In the examples above, the binary format structural information (as well as global structural information) was described as registered at the relational database 13. Alternatively, the binary format structural information (along with global structural information) may be stored in a different database.

In the foregoing description, each structured document was shown decomposed into partial structures of a single tier. Alternatively, a massive document may be decomposed into partial structures of plural tiers. Multiple-tier global structural information may then be combined appropriately for management of the document and for searches therethrough.

As described and according to the invention, the structure document is associated with two distinct kinds of information: information about each of the elements making up the document, and relations between the elements. The information about the elements is managed as records in the relational database, whereas the relations between the elements are managed as structural information in a binary format. The inventive setup permits managing the structured document and making searches therethrough by attribute, by content or by document structure easily and rapidly. The binary format structural information may also be registered as records in the relational database. In this case, the structured document may be managed in unified fashion by use of the relational database.

When the structure document is decomposed into partial structures, the document may be managed by generating relevant structural information in a binary format about each of the partial structures involved. Following editing work on the document, this arrangement makes it possible to limit the scope of structural information reconstitution to the actually edited partial structure. The time required to reconstitute the structural information is then shorted considerably. Since no other partial structures are affected by the editing of any one partial structure, plural workers can work in parallel on a single structured document, each worker dealing with a specific partial structure of the document in a cooperative editing environment.

After editing work, only the edited differences are registered, and any deleted elements are switched from their null-version state (based on unedited version information) to a version information-established state. The arrangement allows all elements having no established version information to be considered the elements included in the latest version. This permits rapid and easy acquisition of a desired document in the most recent version.

As many apparently different embodiments of this invention may be made without departing from the spirit and scope thereof, it is to be understood that the invention is not limited to the specific embodiments thereof except as defined in the appended claims.

The entire disclosure of Japanese Patent Application No. 2001-254400 filed on Aug. 24, 2001 including specification, claims, drawings and abstract is incorporated herein by reference in its entirety.

What is claimed is:

1. A structured document management system for managing a structured document, comprising:
    an element registration unit that registers attribute information and content information about each of elements in the structured document as element information;
    a decomposition unit that decomposes an inputted structured document into plural partial structures in accordance with a setting and generates a hierarchical relationship between the partial structures as first structural information
    a structural information registration unit that:
        determines a hierarchical relationship between the elements in the partial structure as second structural information;
        assigns each of the elements in the partial structure a depth first node order; and
        associates a maximum node order of node orders of elements with each element in the partial structure
        registers the first and second structural information as binary format structural information; and
    an information retaining unit that retains the element information registered by the element registration unit as a record of a relational database while preserving the binary format structural information registered by the structural information registration unit.

2. The structured document management system according to claim 1, wherein the information retaining unit retains the structural information as a binary format file in the relational database.

3. The structured document management system according to claim 1,
    wherein the element registration unit and the structural information registration unit cause the information retaining unit to register element information and structural information about each of the partial structures decomposed by the decomposing unit.

4. The structured document management system according to claim 1, further comprising a difference analyzing unit that analyzes a difference between each of the elements in an unedited structured document previously retained by the information retaining unit on the one hand, and each of the elements in the newly edited and inputted structured document as a result of editing the unedited structured document on the other hand,
    wherein the element registration unit registers element information about any difference analyzed by the difference analyzing unit; and
    wherein the structural information registration unit generates and registers structural information including the difference.

5. The structured document management system according to claim 4, wherein the element registration unit, if finding any element deleted by the difference analyzing unit upon difference analysis, furnishes a record corresponding to the deleted element with version information in effect prior to the editing while generating an index reflecting the version information to arrange the element with no prior version information attached thereto to make up the most recent structured document available for a search.

6. A structured document management method for managing a structured document, comprising the steps of:
    registering attribute information and content information about each of elements in the structured document as element information;
    decomposing an inputted structured document into plural partial structures in accordance with a setting and generates a hierarchical relationship between the partial structures as first structural information
    determining a hierarchical relationship between the elements in the partial structure as second structural information;
    assigning each of the elements in the partial structure a depth first node order; and
    associating a maximum node order of node orders of elements with each element in the partial structure
    registering the first and second structural information as binary format structural information; and
    retaining the element information registered by the element registration part as a record of a relational database while preserving the binary format structural information registered by the structural information registration part.

7. The structured document management method according to claim 6, further comprising the step of retaining the structural information as a binary format file in the relational database.

8. The structured document management method according to claim 6, further comprising the steps of:
    retaining a relation between the partial structures as binary format structural information; and
    retaining element information and structural information about each of the partial structures decomposed in the decomposing step.

9. The structured document management method according to claim 6, further comprising the steps of:
    analyzing a difference between each of the elements in an unedited structured document previously retained on the one hand, and each of the elements in the newly edited and inputted structured document as a result of editing the unedited structured document on the other hand; and
    retaining element information about any difference analyzed in the analyzing step while generating and registering structural information including the difference.

10. The structured document management method according to claim 9, further comprising the steps of:
    if finding any element deleted in the analyzing step, then furnishing a record corresponding to the deleted element with version information in effect prior to the editing while generating an index reflecting the version information to arrange the element with no prior version information attached thereto to make up the most recent structured document available for a search.

* * * * *